United States Patent
Mirza et al.

(10) Patent No.: US 10,988,387 B2
(45) Date of Patent: Apr. 27, 2021

(54) RELEASING IMPURITIES FROM A CALCIUM-BASED MINERAL

(71) Applicant: Carbon Cycle Limited, Sutton (GB)

(72) Inventors: Waqas Mirza, Sutton (GB); Stephen Florence, Sutton (GB); Ian Thaxter, Sutton (GB); David Sevier, Sutton (GB)

(73) Assignee: Carbon Cycle Limited, Surrey (GB)

( * ) Notice: Subject to any disclaimer, the term of this patent is extended or adjusted under 35 U.S.C. 154(b) by 24 days.

(21) Appl. No.: 16/467,689

(22) PCT Filed: Dec. 8, 2017

(86) PCT No.: PCT/GB2017/053697
§ 371 (c)(1),
(2) Date: Jun. 7, 2019

(87) PCT Pub. No.: WO2018/104749
PCT Pub. Date: Jun. 14, 2018

(65) Prior Publication Data
US 2020/0071179 A1 Mar. 5, 2020

(30) Foreign Application Priority Data

Dec. 9, 2016 (GB) .................................... 1621017
Sep. 15, 2017 (GB) .................................... 1714927

(51) Int. Cl.
*C01F 11/02* (2006.01)
*C01F 11/18* (2006.01)
(Continued)

(52) U.S. Cl.
CPC .......... *C01F 11/185* (2013.01); *B43K 19/003* (2013.01); *B43K 19/16* (2013.01);
(Continued)

(58) Field of Classification Search
CPC .......... C01F 11/18; C01F 11/468; C01F 11/48; C01F 11/02; C01F 11/185; C01F 11/46; C09D 13/00; B43K 19/003; C01C 1/24
See application file for complete search history.

(56) References Cited

U.S. PATENT DOCUMENTS 2,795,486 A 6/1957 Pluim
3,990,642 A * 11/1976 Nott .................... C01F 11/18
241/20

(Continued)

FOREIGN PATENT DOCUMENTS

CN 109082245 A * 12/2018 ............. C01F 11/18
SU 945 076 B * 7/1982
SU 945076 A1 7/1982

OTHER PUBLICATIONS

Search Report from the Intellectual Property Office of the UK Patent Office for Application No. GB1621017.1, dated Apr. 20, 2017 (4 pages).

(Continued)

*Primary Examiner* — Timothy C Vanoy
(74) *Attorney, Agent, or Firm* — Cook Alex Ltd.; R. Blake Johnston

(57) ABSTRACT

A method for releasing impurities from a calcium-based mineral is described. The method comprises reacting a calcium-based mineral containing impurities with an aqueous solution of one or more ionic salts at a temperature of approximately 85° C. or above, wherein at least one of the calcium-based mineral and the one or more ionic salts comprises sulphate and at least one of the calcium-based mineral and the one or more ionic salts comprises ammonium, and wherein the concentration of the solution is approximately 25% or higher mass fraction, such that double salt crystals are formed and impurities are released. The method further comprises separating the double salt (Continued)

Figure 1:
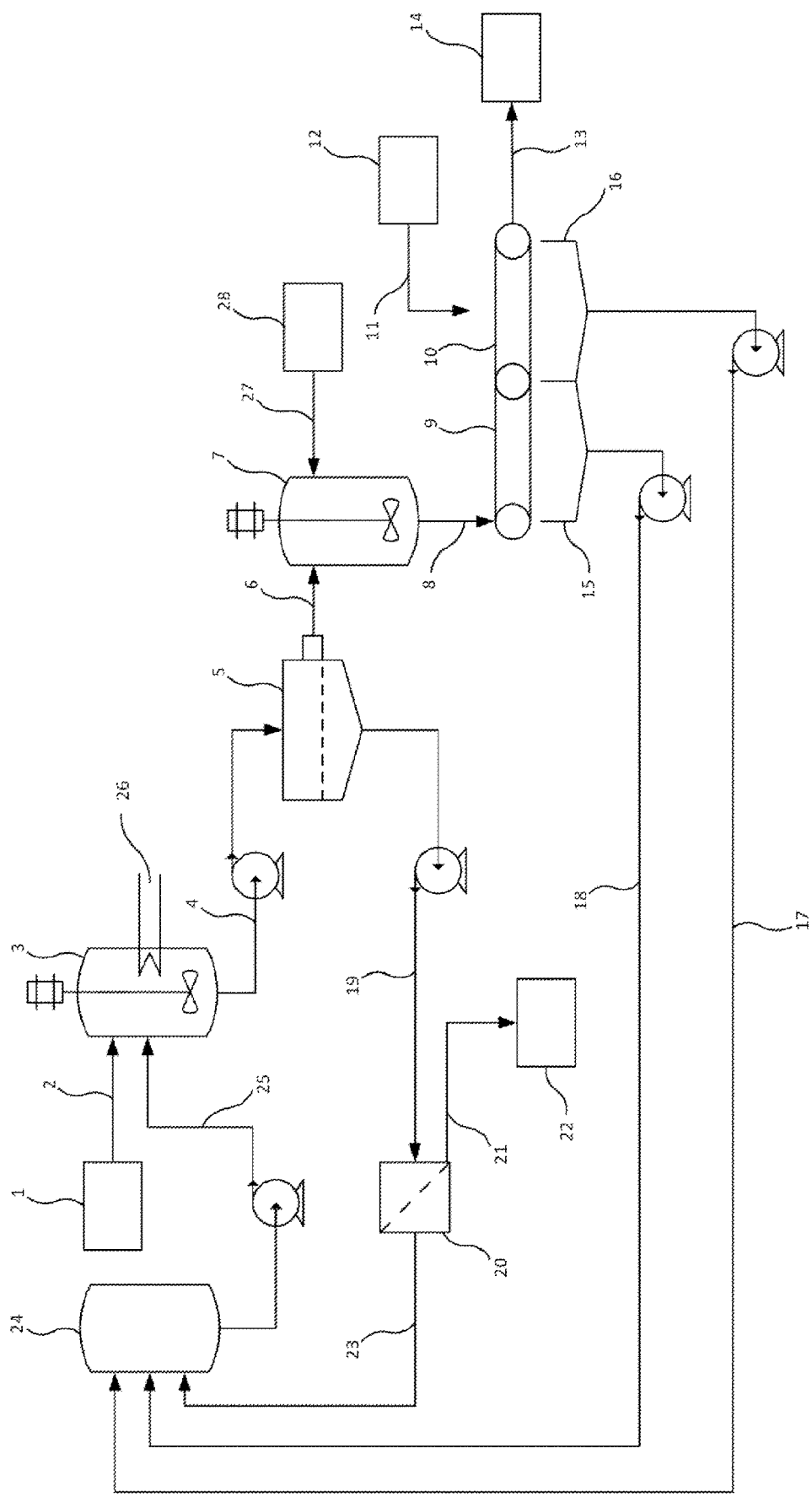

crystals from the impurities. Various products of the process are also described.

22 Claims, 2 Drawing Sheets

(51) Int. Cl.
    *C01F 11/46* (2006.01)
    *C01F 11/48* (2006.01)
    *C09D 13/00* (2006.01)
    *B43K 19/00* (2006.01)
    *B43K 19/16* (2006.01)

(52) U.S. Cl.
    CPC ............ *C01F 11/02* (2013.01); *C01F 11/468* (2013.01); *C01F 11/48* (2013.01); *C09D 13/00* (2013.01)

(56) References Cited

U.S. PATENT DOCUMENTS

| | | | |
|---|---|---|---|
| 4,627,970 A * | 12/1986 | Kruger | C01F 11/468 210/777 |
| 9,873,616 B2 * | 1/2018 | Toman | B09B 5/00 |
| 10,549,256 B1 * | 2/2020 | Griffard | B01J 20/28069 |
| 10,590,003 B1 * | 3/2020 | Dingman | C09C 1/021 |
| 2005/0089466 A1 * | 4/2005 | DeGenova | C01F 11/18 423/430 |

OTHER PUBLICATIONS

International Search Report and Written Opinion of the European Paten Office for International Application No. PCT. GB2017/053697, dated Mar. 14, 2018 (14 pages).

* cited by examiner

RELEASING IMPURITIES FROM A CALCIUM-BASED MINERAL

FIELD

The invention relates to methods for releasing impurities from a calcium-based mineral, including enhancing the purity of a calcium-based mineral, as well as products produced by such methods.

BACKGROUND

Gypsum is commonly sold for use as a filler or pigment. Moreover, the potential exists for gypsum powders to displace a number of other substances such as calcium carbonate, talc and titanium dioxide for various purposes if the brightness and purity of the gypsum could be brought up to comparable levels.

As one example, pure white calcium carbonate has a high commercial value as a powder when used as a filler or pigment. The production of ammonium sulphate through the reaction of gypsum with ammonia and $CO_2$ is a well-established method that has been used for many years and is well documented. At one point it was the primary method for production of ammonium sulphate. However, whilst it is an effective method of producing ammonium sulphate, it also creates a calcium carbonate by-product. Unfortunately the calcium carbonate so produced suffers from purity issues as the impurities in the gypsum feedstock ultimately end up in the calcium carbonate. The level of impurities, even when using mined natural gypsum as the feedstock, is high and this results in the calcium carbonate ending up as a by-product sometimes called 'Lime Mud', which as the name suggests is dirty calcium carbonate. This by-product has limited application and although it can be used as a low value product to 'sweeten' low pH soils, it may also simply be stored in a slag heap as a waste product. The issue can be even more severe when the gypsum used is from power station flue gas desulphurisation (FGD gypsum) as this gypsum can have high levels of noxious contaminates which may even prevent its use as a soil sweetener.

Another known method of producing calcium carbonate is by a classic process of carbonisation, but this is carbon and energy intensive and requires calcining limestone at temperatures of 900-1000° C. It is also restricted by the availability of suitable high-quality limestone deposits which are both relatively rare and also diminishing. By contrast, natural gypsum is abundant all over the world and there are also industrial by-product sources such as FGD gypsum and phosphogypsum, hence producing calcium carbonate through the above-described ammonium sulphate process would not suffer from the same issues of lack of availability of feedstock deposits. Calcium carbonate produced from this process could potentially be used as a filler or pigment if it was sufficiently clean and pure. Hence production of pure and clean calcium carbonate as a by-product of the ammonium sulphate process could provide a means of producing commercial grade calcium carbonate at a lower cost and with a lower carbon footprint.

There are also many waste streams of calcium carbonate which result from industrial processes such as paper and pulp production.

The purity of the calcium carbonate powder has a direct bearing on its brightness and other characteristics such as abrasiveness. In certain uses, for example as a pigment in the coating of paper, the calcium carbonate powder is desired to have a maximal degree of brightness whilst having minimal abrasiveness.

Another property of gypsum or calcium carbonate that can be important for some uses is a lack of abrasiveness. Insoluble impurities in particular, such as sand for example, can cause abrasiveness.

For the above-discussed reasons, there have been developed numerous processes intended for enhancing the purity of gypsum.

European Patent publication no. 2279151 discloses a method of purifying gypsum using magnetic separation and acid washing. The disclosed method will remove the majority of magnetic particles and any impurities that are soluble in acid solutions but will not remove insoluble and non-magnetic contaminates such as silica, which is one of the causes of abrasiveness. The process will also have no effect on the impurities that are enveloped in the gypsum crystal lattice and hence the process will only be effective after the gypsum has been ground to a level that liberates such impurities first, else on further grinding these impurities will be released, adversely affecting the brightness. In addition, washing with an acid solution typically consumes the acid, which is costly in terms of the acid and creates a waste issue.

UK Patent no. 577,970 discloses a method of purification of calcium sulphate in which dehydrated gypsum is crystallised (rehydrated) in a dilute electrolyte solution to slow the crystallisation process such that the finer impurities precipitated by this crystallisation can be mechanically separated from the larger gypsum dihydrate crystals. This document teaches that with a dilute electrolyte solution the impurities do not precipitate out until the crystallisation stage, which is specified as requiring between 12 and 24 hours, and that separation is possible because the gypsum crystals have grown large in comparison to the smaller size of the impurities. This method is difficult to implement due to the excessive time that is required for crystallisation if the impurities are to be excluded.

Other processes, such as the Giulini Process, use a method of acid dehydration where gypsum is heated in an acidic solution in order to dehydrate it and release the impurities enveloped within the gypsum crystals which dissolve in the acidic solution. Such processes have several problems. The acid environment is highly aggressive to equipment, requiring costly materials to be employed and increasing maintenance costs. The impurities are dissolved into the acidic solution which makes them difficult and costly to remove out of the process. Acid dehydration processes are not tolerant of fluoride contamination as this reacts to become hydrofluoric acid. Under the heated conditions of this process, very few materials are compatible with hydrofluoric acid.

Thus there is a clear need in the art for a process by which high purity gypsum could be produced but which would not suffer from the disadvantages found in prior art processes.

SUMMARY

According to a first aspect, there is provided a method for releasing impurities from a calcium-based mineral. The method comprises reacting a calcium-based mineral containing impurities with an aqueous solution of one or more ionic salts at a temperature of approximately 85° C. or above, wherein at least one of the calcium-based mineral and the one or more ionic salts comprises sulphate and at least one of the calcium-based mineral and the one or more ionic salts comprises ammonium, and wherein the concentration of the solution is approximately 25% or higher mass fraction such that double salt crystals are formed and impurities are released. The method further comprises separating the double salt crystals from the impurities.

The term "approximately" may mean+/−1-5° C. or to within a degree Centigrade. The aqueous salt solution may be a concentrated solution. The skilled person will understand the term "concentrated solution". In this context it may mean having a concentration of salt greater than approximately 25% mass fraction. In some preferred examples, the concentration may be between 25% and 40% mass fraction, although it could be as high as 50% mass fraction. "Approximately" in this context may include up to 1-2% lower than 25%.

The method may further comprise reacting the double salt crystals in an aqueous solution to precipitate gypsum.

The reacting of the calcium-based mineral with the aqueous solution may comprise combining the calcium based mineral with the aqueous salt solution to form a slurry. The impurities previously enveloped within the calcium based mineral can be released into the slurry.

The separating may comprise separating the double salt crystals from the slurry and the impurities therein at a temperature above approximately 80° C. The term "approximately" may mean+/−1-5° C. or to within a degree Centigrade.

The calcium based mineral can be any mineral having a significant calcium component, for example in the form of calcium carbonate ($CaCO_3$), calcium sulphate ($CaSO_4$), calcium oxide (CaO) or calcium sulphite ($CaSO_3$). The component would be significant if it made up around 20% or greater of the mineral. Up to 1-2% less may be sufficient. The percentage of calcium component may be defined by a weight percentage.

The calcium based mineral may comprise one or more of gypsum or chalk from any source including one or more of: mined; recycled; and industrial by-product.

The calcium based mineral may comprise particles having a size less than 1000 microns. In some preferred examples, the particle size may be less than 250 microns.

The reacting may comprise heating to a temperature of approximately 90° C. or above or approximately 100° C. or above. It could comprise heating to approximately 120° C. or to approximately 140° C. or to approximately 150° C. The reacting may comprise heating to any temperature between approximately 85° C. and 150° C. but a temperature of approximately 100° C. may be preferred as a balance between minimizing the heating energy required whilst achieving a brightness of approximately between 85-94%, which can equate to a purity of around 95% or higher, which can be advantageous for some uses. Moreover, in order to achieve higher temperatures, the pressure may need to be increased to up to approximately 4 atmospheres, which also requires energy which may be saved by using lower temperatures. Higher temperatures and pressures may be used if desired and fall within the scope of examples.

The residence time of the reaction may be between approximately 5 minutes and 2 hours. In some preferred examples it may be between approximately 10 and 20 minutes.

The reacting may be carried out at a pressure between approximately atmospheric pressure and 4 atmospheres. In some preferred examples it may be between approximately 1 and 2 atmospheres.

The calcium based mineral to water mass ratio may be greater than 1:1. In some preferred examples it may be between approximately 1:2 and 1:50, or between approximately 1:5 and 1:20.

The method may further comprise capturing at least some of any gases released by the reaction. The method may further comprise allowing the double salt to settle in the slurry prior to the separation.

In any of the above-discussed examples of the method, the one or more ionic salts may comprise ammonium sulphate and the double salt crystals may comprise crystals of koktaite.

The koktaite may be reacted with an aqueous solution to form a gypsum product. This may involve decomposition of the koktaite. The gypsum product may be a high purity gypsum product.

The method may further comprise separating the gypsum product from the aqueous solution.

The aqueous solution with which the koktaite may be reacted may contain ammonium sulphate at a concentration less than approximately 40% mass fraction. In some preferred examples, the concentration may be less than approximately 10% mass fraction.

The residence time to form the gypsum product by reaction with the aqueous solution may be between approximately 1 minute and 1 hour. In some preferred examples, the residence time may be between 15 and 20 minutes.

The temperature of the reaction with the aqueous solution to form the gypsum product may between approximately 5° C. and 70° C. In some preferred examples, the temperature may be between approximately 10 and 30° C.

The koktaite may comprise a double salt crystal of calcium sulphate and ammonium sulphate having a chemical formula $(NH_4)_2SO_4.CaSO_4.H_2O$, and the double salt optionally comprises one or more other double salts of ammonium sulphate and calcium sulphate selected from di-calcium salt and penta-calcium salt and may also include calcium sulphate and its related hydrates.

The gypsum product formed may be primarily calcium sulphate dihydrate, but may also include $CaSO_4.xH_2O$ where x is between 0 and 2.

When reacting the calcium-based mineral containing the impurities with an aqueous solution, the impurities may be released as a solid or semi-solid layer. Any soluble impurities may dissolve into the solution.

In any of the above examples of a method, the separating may be by one or more of the following: weir; decanting; centrifuging; hydrocycloning; vibratory sieving; filtering; and other standard separation methods.

The impurities may comprise rare earth elements and the method may further include collecting the rare earth elements. The impurities may comprise precious metals, such as gold, and the method may further include collecting the precious metals. This may be possible in particular when the calcium-based mineral is phosphogypsum.

The method may further include, after separating the double salt crystals from the impurities, separating the impurities from the aqueous salt solution. The method may also further include recycling the resulting aqueous salt solution for use in the process for reacting with more calcium-based mineral.

Any of the above-described features may be used in a method in any feasible combinations. In examples where gypsum is produced, this may be provided to another process in which it can be converted to chalk.

According to a second aspect, there is provided gypsum produced by any of the above-described methods in any feasible combinations. In particular, there is provided a method for releasing impurities from a calcium-based mineral to produce gypsum, the method comprising reacting a calcium-based mineral containing impurities with an aqueous solution of one or more ionic salts at a temperature of approximately 85° C. or above, wherein at least one of the calcium-based mineral and the one or more ionic salts comprises sulphate and at least one of the calcium-based mineral and the one or more ionic salts comprises ammonium, and wherein the concentration of the solution is approximately 25% or higher mass fraction such that double salt crystals are formed and impurities are released. The method further comprises separating the double salt crystals from the impurities, reacting the double salt crystals with an aqueous solution to precipitate gypsum and separating the gypsum from the aqueous solution.

According to a third aspect, there is provided chalk produced by or during any of the above-described methods in any feasible combination. In particular, there is provided a method for releasing impurities from a calcium-based mineral to produce chalk, the method comprising reacting a calcium-based mineral containing impurities with an aqueous solution of one or more ionic salts at a temperature of approximately 85° C. or above, wherein at least one of the calcium-based mineral and the one or more ionic salts comprises sulphate and at least one of the calcium-based mineral and the one or more ionic salts comprises ammonium, and wherein the concentration of the solution is approximately 25% or higher mass fraction such that double salt crystals are formed and impurities are released. The method further comprises separating the double salt crystals from the impurities, reacting the double salt crystals with an aqueous solution to precipitate gypsum, separating the gypsum from the aqueous solution and converting the gypsum to chalk.

According to a fourth aspect, there is provided a method for releasing impurities from a calcium-based mineral to produce chalk, the method comprising reacting a calcium-based mineral containing impurities with an aqueous solution of one or more ionic salts at a temperature of approximately 85° C. or above, wherein at least one of the calcium-based mineral and the one or more ionic salts comprises sulphate and at least one of the calcium-based mineral and the one or more ionic salts comprises ammonium, and wherein the concentration of the solution is approximately 25% or higher mass fraction such that double salt crystals are formed and impurities are released; separating the double salt crystals from the impurities; and converting the double salt crystals to chalk.

According to a further aspect, there is provided a method for releasing impurities from a calcium-based mineral to produce a mixture of rare earth elements or precious metals, the method comprising: reacting a calcium-based mineral containing a mixture of rare earth elements with an aqueous solution of one or more ionic salts at a temperature of approximately 85° C. or above, wherein at least one of the calcium-based mineral and the one or more ionic salts comprises sulphate and at least one of the calcium-based mineral and the one or more ionic salts comprises ammonium, and wherein the concentration of the solution is approximately 25% or higher mass fraction such that double salt crystals are formed and impurities are released; separating the double salt crystals from the rare earth elements; and collecting the mixture of rare earth elements.

As mentioned herein, the existing processes for the production of commercial grade calcium carbonate are limited by the availability of suitable high grade limestone, chalk and marble deposits. Therefore there is a need to provide alternative routes to producing calcium carbonate which utilise more abundant mineral deposits such as naturally-occurring gypsum and industrial by-products such as FGD gypsum, phosphogypsum, and waste calcium carbonate from pulp mills. The present invention provides such a route. Moreover, the present invention provides a means for enhancing the purity of gypsum. Where the term "high purity" is used herein, it is not intended to be limited to a particular purity percentage but may include purities of approximately 85% or 90% or higher, such as any percentage up to 99.9%, which are useful in their own right and may also be useful for subsequent uses such as chalk manufacture. "Approximately" in this context may include up to 1-2% lower than a stated percentage.

DRAWINGS

Figure 2:
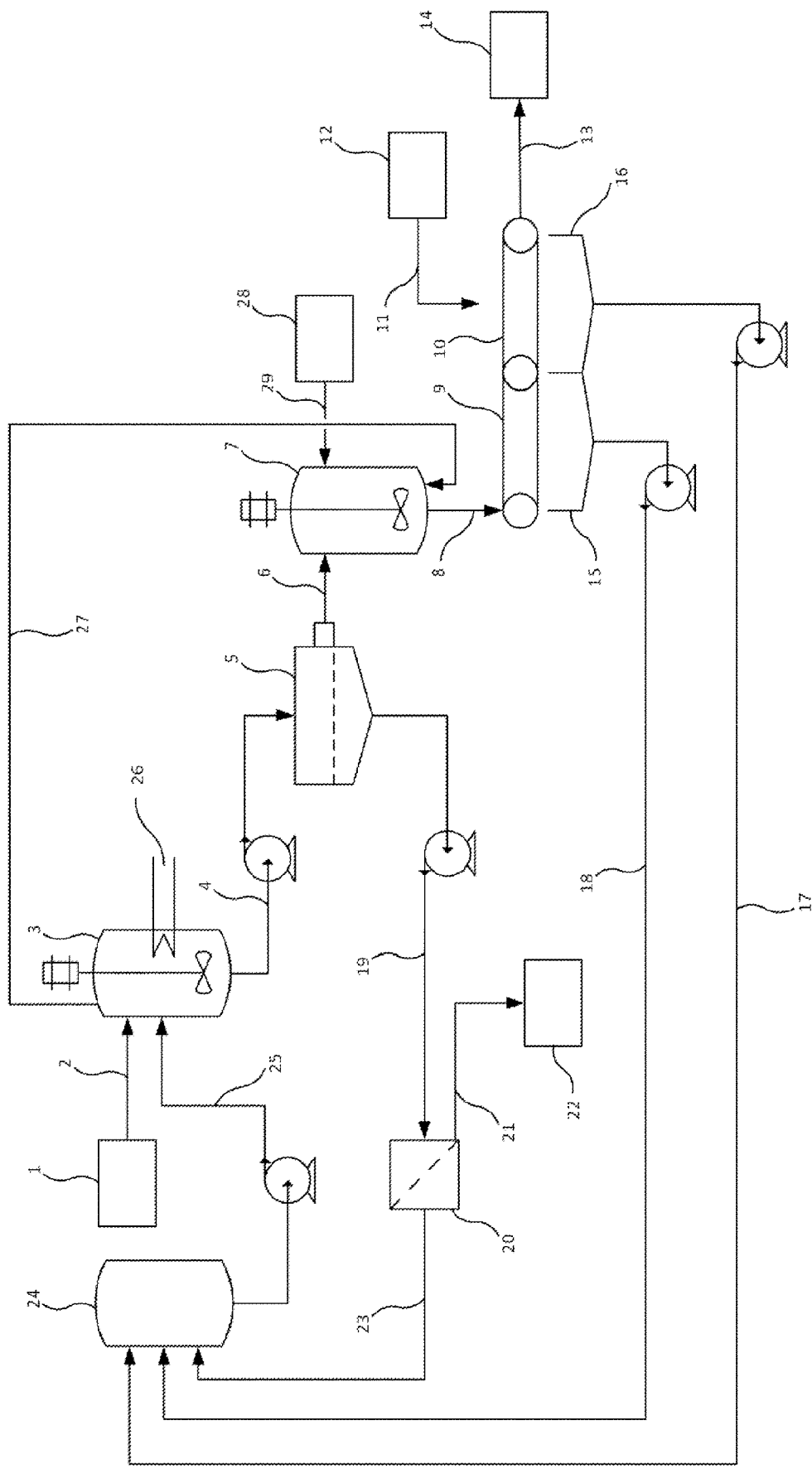

FIG. 1 shows schematically an apparatus suitable for use in implementing a process for separating impurities from gypsum to produce purer gypsum; and FIG. 2 shows schematically an apparatus suitable for use in implementing a process for separating impurities from chalk to produce purer chalk.

In the figures, like reference numerals indicate like parts.

DETAILED DESCRIPTION

Examples discussed herein are based on the surprising discovery that the reaction of calcium based minerals with selected concentrated aqueous salt solutions such as ammonium sulphate at a temperature above approximately 85° C. or 90° C. results in the rapid transition of the existing calcium based crystals to double salts of calcium sulphate and ammonium sulphate, primarily koktaite, whilst liberating and precipitating impurities. The decomposition of the existing crystal structure takes place rapidly and allows the impurities previously enveloped to be liberated. Advantageously, the new double salt crystals form to exclude the impurities and the liberated impurities precipitate to remain largely in solid phase. This surprising effect arises in particular when the concentration of the salt solution is above 25% and the temperature is above 85° C. If allowed to settle, for even just a few seconds, a slurry formed from the calcium based mineral and the concentrated aqueous salt solution splits into discreet layers, with the double salt crystals forming a white bottom layer and the precipitated impurities forming a darker layer on top, usually immediately on top. Provided the temperature is maintained, the double salt crystals remain stable and separation from the impurities is easily achieved. Once separated, the double salt crystals can be decomposed using an aqueous solution, whereby calcium sulphate (i.e. gypsum) crystals form and any other salts are dissolved into the aqueous solution.

The end result is a gypsum product of high purity with favourable properties including high brightness and low abrasiveness. Our experimentation has proven the claimed process to be very effective, resulting in marked improvement in purity, and as a result, increased brightness and reduced abrasiveness. Purity values of 99.9% determined by X-ray diffraction (XRD) analysis were routinely achieved from source gypsum which had a starting purity of 75-90%. This is indicated in the examples below by a brightness of approximately 85% or 90% or higher—brightness is a proxy for purity but may be a lower number than an equivalent purity, because a small amount of impurity can result in a disproportionate impact on brightness. One standard for measuring brightness is as against barium sulphate. As measured against barium sulphate, the high purity gypsum was found to have an enhanced brightness value of 101.5%, having had a starting value of 77%.

Some examples enable the production of high purity gypsum from low grade calcium based minerals with a significant calcium component, for example in the form of calcium carbonate ($CaCO_3$), calcium sulphate ($CaSO_4$), calcium oxide (CaO) or calcium sulphite ($CaSO_3$); such as gypsum and chalk from sources including but not limited to: mined, recycled or industrial by-product. Some examples are able to achieve this at relatively low temperatures and with moderate or no pressurisation depending on the mineral to be processed as feedstock. A cheap salt is used to accomplish the cleaning rather than resorting to mineral acids as described in much of the prior art. Some examples enable production of purified gypsum in far shorter process times than those found in the prior art. In some examples, production of high purity gypsum is achieved in a matter of minutes rather than hours or even days in some prior art cases. The present invention results in liberated impurities being retained in largely solid phase and hence eminently separable from the high purity product, thus allowing very high purities to be achieved with relative ease.

The impurities may be desirable or undesirable in their own right. For example, in some cases, one impurity may be sand. Sand is generally considered an undesirable impurity due to its abrasiveness. Other undesirable impurities include radioactive elements and heavy metals, both of which are generally considered harmful to health, due to their radio-activity and poisonous properties respectively.

In some cases, it may also be desirable to collect the impurities. For example, the starting material may be phosphogypsum. Phosphogypsum often includes rare earth elements and/or precious metals, which can be a valuable product. Once liberated from the starting material as impurities, as described above, the rare earth elements and/or precious metals can be collected. They may be collected as a mixture of rare earth elements and/or precious metals. A mixture of rare earth metals is itself a valuable commercial product that can be subsequently provided to another process for separation into individual elements.

Among other applications, the processes described herein may provide a means of purifying waste streams so that the resulting product can be used as a filler or pigment.

Some aspects of the examples described herein will now be discussed.

Calcium Based Mineral

The term 'calcium based mineral' is used to broadly refer to any mineral having a significant calcium component, for example in the form of calcium carbonate ($CaCO_3$), calcium sulphate ($CaSO_4$), calcium oxide (CaO) or calcium sulphite ($CaSO_3$). It may be advantageous for gypsum or chalk to be used, especially if they are readily available in abundant supply. The calcium based mineral can come from any source such as but not limited to: mined, recycled, or industrial by-product. It may be a hydrated mineral such as gypsum.

The calcium based mineral may be prepared so that it has a particle size of less than 1000 microns. In some examples, a particle size of less than 250 microns may be preferred, in order to speed up reaction time, but this is not essential.

Aqueous Salt Solution

The aqueous salt solution as used herein is an ionic salt solution and may be a 'concentrated aqueous salt solution', which refers to an aqueous salt solution containing any one or a mixture of salts from ammonium sulphate, ammonium chloride or sodium sulphate. In some examples, ammonium sulphate may be preferred, especially if ammonia is to be recovered as an additional part of the process. The concentration of salt in the concentrated aqueous salt solution should be greater than approximately 25% mass fraction and preferably between approximately 25% and 40% mass fraction, although it may be as high as 50% mass fraction.

Slurry

In some examples, the calcium based mineral and a concentrated aqueous salt solution can be combined to form slurry, where the calcium based mineral to water mass ratio is greater than 1:1. In some examples, it may preferably be between 1:2 and 1:50, and more preferably between 1:5 and 1:20.

Double Salt

The double salt may be principally koktaite, which refers to a double salt crystal of calcium sulphate and ammonium sulphate which has the chemical formula $(NH_4)_2SO_4 \cdot CaSO_4 \cdot H_2O$. The double salt may also include one or more other double salts of ammonium sulphate and calcium sulphate, such as the di-calcium salt ($2CaSO_4 \cdot (NH_4)_2SO4$) and penta-calcium salt ($5CaSO_4 \cdot (NH_4)_2SO4 \cdot H_2O$), and may also include calcium sulphate and its related hydrates.

It will be appreciated by those skilled in the art that the rate of conversion from the calcium based mineral to double salt will be dependent on the process conditions such as temperature, pressure, salt concentration and water mass ratio.

Heating

Depending on the calcium based mineral to be processed, the level of gypsum purity required and the speed of conversion, the slurry can be heated to between approximately 85° C. and 150° C. The slurry may be stirred to speed the reaction process. For processing of gypsum as the calcium based mineral, the temperature is preferably maintained between 100° C. and 102° C. with a preferable residence time of between 10 and 20 minutes if stirred. For processing of chalk as the calcium based mineral, the temperature is preferably maintained between 120° C. and 126° C. with a preferable residence time of between 10 and 20 minutes if stirred. It will be appreciated that to achieve the higher temperatures, pressure up to 4 bars may need to be applied. Depending on the conditions, residence times between 5 minutes and 2 hours may be necessary to achieve complete conversion. Higher temperatures and pressures may be used if desired.

Conversion

Conversion of the calcium based mineral will progress dependent on the calcium based mineral being processed. Examples of the conversion reactions are as follows:

Gypsum

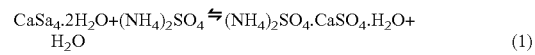

$$CaSa_4 \cdot 2H_2O + (NH_4)_2SO_4 \rightleftharpoons (NH_4)_2SO_4 \cdot CaSO_4 \cdot H_2O + H_2O \qquad (1)$$

Chalk

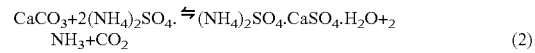

$$CaCO_3 + 2(NH_4)_2SO_4 \rightleftharpoons (NH_4)_2SO_4 \cdot CaSO_4 \cdot H_2O + 2NH_3 + CO_2 \qquad (2)$$

These processes result in the formation of koktaite. Any gases that are released during the conversion reaction may be captured and removed from the process or alternatively retained in the process. One or more gases released during the process may be captured and/or released from the reaction volume so as to influence the equilibrium between gypsum or chalk and the respective double salt.

If the koktaite formed is further reacted with an aqueous solution or water, an aqueous solution of gypsum will result. The gypsum created can be used in its own right or provided to another process such as that mentioned in the background above to be converted back to chalk if desired.

The products of equation 2 can be used to create chalk according to the following reaction:

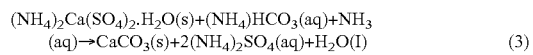     (3)

The chalk created can also be used in its own right.

Separating the Double Salt

Once the slurry has been heated at the defined temperature for the specified residence time, the calcium based mineral crystals will have transitioned to koktaite (and possibly some other double salts) and the impurities previously enveloped will have been liberated and will largely be in solid phase, although some may have dissolved into the concentrated aqueous salt solution. The slurry can be kept above 80° C. during the separation, so as to avoid the double salts starting to decompose—this could result in calcium sulphate dihydrate crystals starting to form with the impurities being enveloped within them.

If the slurry is allowed to settle, the koktaite (and other double salts if present), being large double crystals, will quickly settle to the bottom with the impurities forming a layer in the concentrated aqueous salt solution above. As the double salt crystals may also have a larger crystal size than the impurities, the koktaite can be easily separated from the impurities using a weir, decanting, centrifuging, hydrocycloning, vibratory sieving, filtering or other standard separation techniques. Some types of filtering may not require settling.

It will be appreciated by those skilled in the art that the double salt could be used directly in processes that are based on gypsum and ammonia such as that mentioned in the background above.

Aqueous Solution for Reacting with the Double Salt

The term 'aqueous solution' refers to either water or an aqueous solution containing ammonium sulphate at a concentration less than approximately 40% mass fraction, in some examples, preferably less than approximately 10%.

High Purity or Purified Gypsum

'Gypsum' refers to calcium sulphate dihydrate ($CaSO_4.2H_2O$), but may also include $CaSO_4.xH_2O$ where x is between 0 and 2.

Reacting the Double Salt

In one embodiment the koktaite (and any other double salts present) may be reacted with an aqueous solution such that it decomposes to form high purity gypsum. Ammonium sulphate is also formed, and dissolves in the aqueous solution. The reaction may be performed at a temperature between approximately 5° C. and 70° C., in some examples preferably between 10 and 30° C. The residence time may be from approximately 1 minute to 1 hour, in some examples preferably between approximately 10 and 20 minutes.

Separating the High Purity Gypsum

In some examples the high purity gypsum may be separated from the aqueous solution using a weir, decanting, centrifuging, hydrocycloning, vibratory sieving, filtering or other standard separation techniques.

In some examples, which may include examples where the objective is to purify chalk, the calcium based mineral salt can be calcium carbonate and the aqueous salt solution can be ammonium sulphate solution. These may have the following properties:

Calcium Carbonate

The term 'calcium carbonate' refers to $CaCO_3$ based minerals, preferably chalk, from any source such as but not limited to; mined, recycled or industrial by-product.

The calcium carbonate may be prepared so that it has a particle size less than 1000 microns, preferably less than 250 microns, in order to speed up reaction time.

Concentrated Ammonium Sulphate Solution

The term 'concentrated ammonium sulphate solution' refers to an aqueous salt solution containing ammonium sulphate in a concentration greater than approximately 25% mass fraction and preferably between 40% and 50% mass fraction.

Slurry

The calcium carbonate and concentrated ammonium sulphate solution can be combined to form a slurry where the calcium carbonate to water mass ratio is greater than 1:1, preferably between 1:2 and 1:50, and more preferably between 1:5 and 1:20.

Heating

The slurry may be stirred to speed the reaction. The slurry can be heated and maintained at a temperature between 85° C. and 150° C. and preferably between 120° C. and 126° C. with a preferable residence time of between 10 and 20 minutes if stirred. It will be appreciated by those skilled in the art that to achieve the higher temperatures, pressure will need to be applied. Depending on the conditions, residence times between 5 minutes and 2 hours may be necessary to achieve complete conversion.

The reaction will progress according to the following chemical equation:

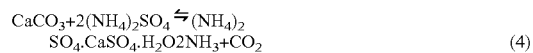     (4)

Example Process for Separating Impurities from Gypsum to Produce Purer Gypsum

A low purity gypsum input (1) is delivered via a stream (2) to a first reactor (3) where it is combined with an aqueous salt solution (25) under mixing and heating (26) for a period of time. A double salt of calcium sulphate and ammonium sulphate is formed in the solution and impurities are released from the gypsum crystal structure as a solid or semi-solid. Any soluble impurities may dissolve into the solution. The slurry of double salt is extracted from the reactor (3) by a stream (4) and delivered to a vibratory sieve separator (5). Here the double salt crystals are separated from the aqueous salt solution which contains the impurities.

The separated double salt is fed (6) to a second reactor (7). The double salt is mixed with a second aqueous salt solution (28) delivered via a stream (27) for a period of time. The second reactor (7) may receive heating or cooling. The double salt is decomposed back to gypsum but now in a purified state. The purified gypsum slurry exits the second reactor (7) and is delivered via a stream (8) to a belt filter (9 & 10). In the first section of the belt filter (9) the purified gypsum is separated from the aqueous salt solution. It then moves to the second section of the belt filter (10) where it is washed with washing fluid (12) via a stream (11) to remove traces of the aqueous salt solution. The washed purified gypsum then leaves the belt filter as a cake via a stream (13) from which it is collected as a purified gypsum product (14).

The separated aqueous salt solution from the belt filter (9) is collected (15). Ideally the collected separated aqueous salt solution is recycled to an aqueous salt solution recirculation tank (24). Similarly, the spent washings from the belt filter (10) are collected (16). Ideally the collected spent washings are recycled to an aqueous salt solution recirculation tank, such as the tank (24).

The separated aqueous salt solution containing impurities from the vibratory sieve separator (5) is pumped via a stream (19) to a filter (20). The filter (20) is able to separate the impurities from aqueous salt solution as a cake waste product (22). This may be used or discarded, in dependence on its content. It may be further processed, for example to extract rare earths. As the skilled addressee will appreciate, the filter may employ various techniques to implement the filtering. As previously mentioned, if allowed to settle, the impurities tend to form a layer in the solution, which layer could be filtered or decanted. The filtered aqueous salt solution is then ideally recycled via a stream (23) to an aqueous salt solution recirculation tank (24). The aqueous salt solution recirculation tank (24) then ideally provides the aqueous salt solution input for the first reactor (3) via a stream (25). In this way, a mass balance of the components for the reaction can be maintained.

Example Process for Separating Impurities from Chalk to Produce Purer Chalk

A low purity chalk input (1) is delivered via a stream (2) to a first reactor (3) where it is combined with an aqueous salt solution (25) under mixing, heating (26) and pressure for a period of time. A double salt of calcium sulphate and ammonium sulphate is formed in the solution and impurities are released from the chalk crystal structure as a solid or semi-solid. Any soluble impurities may dissolve into the solution. Ammonia and carbon dioxide gases are also released by the reaction, which are released via a stream (27) to a second reactor (7). The slurry of double salt is extracted from the reactor (3) by a stream (4) and delivered to a vibratory sieve separator (5). Here the double salt crystals are separated from the aqueous salt solution which contains the impurities.

The separated double salt is fed (6) to a second reactor (7). The double salt is mixed with a second aqueous salt solution (28) delivered via a stream (29) and contacted with the gases (27) from the first reactor (3) for a period of time. The second reactor (7) may receive heating or cooling. The double salt is converted back to chalk but now in a purified state. The purified chalk slurry exits the second reactor (7) and is delivered via a stream (8) to a belt filter (9 & 10). In the first section of the belt filter (9) the purified chalk is separated from the aqueous salt solution. The separated purified chalk then moves to the second section of the belt filter (10) where it is washed with washing fluid (12) via a stream (11) to remove traces of the aqueous salt solution. The washed purified chalk then leaves the belt filter as a cake via a stream (13) from which it is collected as a purified chalk product (14).

The separated aqueous salt solution from the first section 9 of the belt filter is collected (15). Ideally the collected separated aqueous salt solution is recycled to an aqueous salt solution recirculation tank (24). Similarly, the spent washings from the second section 10 of the belt filter are collected (16). Ideally the collected spent washings are recycled to an aqueous salt solution recirculation tank, such as the tank (24).

The separated aqueous salt solution containing impurities from the vibratory sieve separator (5) is pumped via a stream (19) to a filter (20). As previously mentioned, when allowed to settle, the impurities tend to form a layer in the solution and thus the filter (20) is able to separate the impurities from aqueous salt solution as a cake waste product (22). This may be used or discarded, in dependence on its content. It may be further processed, for example to extract rare earths. As the skilled addressee will appreciate, the filter may employ various techniques to implement the filtering. As previously mentioned, if allowed to settle, the impurities tend to form a layer in the solution, which layer could be filtered or decanted. The filtered aqueous salt solution is then ideally recycled via a stream (23) to an aqueous salt solution recirculation tank (24). The aqueous salt solution recirculation tank (24) then ideally provides the aqueous salt solution input for the first reactor (3) via a stream (25). In this way, a mass balance of the components for the reaction can be maintained.

EXPERIMENTS

Slurry was made containing the calcium based mineral, water and the concentrated salt in the predefined concentrations/ratios. The slurry was poured into a bench top pressure reactor vessel and set to operate at the desired temperature and stirring speed. The gas outlet valve was closed and the vessel was left to pressurise, as necessary. A timer was started when the vessel reached the set temperature and pressure. After a predefined testing period, the reactor was turned off and the gas outlet valve was opened to depressurise the vessel, where pressurised. The slurry was allowed to settle for 1 minute, after which the impurities layer that had formed above the layer of double salt was decanted, leaving behind the double salt. The double salt was then mixed with water in a beaker and placed on a heated stirring plate where it was left to stir for a short period of time to decompose to form gypsum. Thereafter, the cleaned gypsum was filtered using a Buchner funnel, leaving a slightly damp sample.

To determine the brightness, the damp sample was put into a crucible made of aluminium foil which was placed in an oven for 24 hours at a temperature of 60° C. The dried sample was then micronized for 1 minute and using a brightness meter, a reading was taken at a wavelength of 457 nm.

Using XRD/X-ray Fluorescence (XRF) analysis, it was determined that brightness is a reliable proxy for purity and that is how the tests were measured and compared. As noted above, brightness percentages may be lower than their corresponding purity percentage, due to the impact on brightness of even a small percentage of impurity. Thus the higher brightness values in the examples below, can be equated to purity values of approximately 99%.

The aim of the experiments in Examples 1-4 was to optimise the variables involved in the method and determine the preferable conditions for processing mined gypsum to remove impurities contained therein.

Example 1

Effect of Salt Concentration

The gypsum used for the example was from a mine and ground to a particle size less than 250 microns and had an initial brightness value of 64.2%.

The test was conducted under the following conditions:
The salt used for the aqueous ionic salt solution was ammonium sulphate.
Gypsum—50 g
Temperature—102° C.
Water Ratio—1:10
Residence Time—30 minutes

| Salt Concentration (%) | Final Brightness (%) |
|---|---|
| 10 | 66.4 |
| 25 | 68.6 |

-continued

| Salt Concentration (%) | Final Brightness (%) |
|---|---|
| 30 | 90.7 |
| 40 | 93.3 |

It was observed that the layer of impurities was noticeably darker from the concentration of 30% and above.

It could be considered that the resulting final brightness was optimized when the salt concentration was greater than 25%.

Example 2

Effect of Temperature

The gypsum used for the example was from a mine and ground to a particle size less than 250 microns and had an initial brightness value of 64.2.

The test was conducted under the following conditions:
Gypsum—50 g
Salt Concentration—40%
Water Ratio—1:10
Residence Time—30 minutes

| Temperature (° C.) | Final Brightness (%) |
|---|---|
| 20 | 64.4 |
| 81 | 76.5 |
| 92 | 88.2 |
| 102 | 93.3 |

It was observed that the layer of impurities was noticeably darker from the temperature of 92° C. and above.

It could be considered that the resulting final brightness was optimized when the temperature was 92° C. and above. However, the results indicate that a temperature of approximately 85° C. would produce a brightness of around at least 80-85%, which can equate to a purity of around 90% and thus may be sufficient for some uses.

Example 3

Effect of Gypsum to Water Ratio

The gypsum used for the example was from a mine and ground to a particle size less than 250 microns and had an initial brightness value of 64.2.

The test was conducted under the following conditions:
Gypsum—50 g
Salt Concentration—40%
Temperature—102° C.
Residence Time—30 minutes

| Ratio | Final Brightness (%) |
|---|---|
| 1:2 | 89.2 |
| 1:5 | 90.1 |
| 1:10 | 93.3 |
| 1:20 | 97.4 |

It could be considered that increasing the ratio of ammonium sulphate solution to gypsum improved the resulting gypsum brightness.

Example 4

Effect of Residence Time

The gypsum used for the example was from a mine and ground to a particle size less than 250 microns and had an initial brightness value of 64.2.

The test was conducted under the following conditions:
Gypsum—50 g
Salt Concentration—40%
Temperature—102° C.
Water Ratio—1:10

| Residence Time (mins) | Final Brightness |
|---|---|
| 15 | 91.3 |
| 30 | 91.5 |
| 45 | 91.0 |
| 60 | 91.4 |

As can be seen, residence time beyond 15 minutes has little impact on the brightness. This example demonstrates that at a salt concentration of 40% and a temperature of 102° C. there is a rapid transition to double salt (observed to be primarily koktaite) and liberation of impurities. This result could be expected to extrapolate to similar temperatures and concentrations.

Example 5

Comparison with Other Processes

The aim of the experiments in Example 5 was to understand the difference in performance between the gypsum processed according to present examples in comparison to alternative methods from the prior art. The experiments were carried out using the same source gypsum used in the previous examples. It can be seen that present examples provide a significantly improved method of producing high purity gypsum.

| Process | Final Brightness |
|---|---|
| Present Invention | 97.4 |
| A | 68.4 |
| B | 83.0 |
| C | 69.0 |
| D | 86.5 |

Process A: Improvements relating to the Purification of Calcium Sulphate (UK Patent no. 577,970) - Using 10% Ammonium Sulphate - after 24 hours crystallisation
Process B: Improvements relating to the Purification of Calcium Sulphate (UK Patent no. 577,970) - Using 10% Sulphuric Acid - after 24 hours crystallisation
Process C: Preparation of Ammonium Sulfate (U.S. Pat. No. 2,795,486)
Process D: Improvements relating to the Purification of Calcium Sulphate (UK Patent no. 577,970) - Using 5% Sulphuric Acid and 5% Ammonium Sulphate - after 24 hours crystallisation Example 6

Collection of Rare Earth Elements

In this example, phosphogypsum derived from igneous phosphate sources was used as the calcium-based mineral starting material. Phosphogypsum often has higher levels of radio nucleotides and rare earth elements than other gypsum products. A sample of phosphogypsum was processed by the present purification process. The sample used comprised quite low levels of rare earth elements (about 0.17%). Typically, phosphogypsum comprises about 0.4% rare earth elements but can comprise as much as 1%. As discussed below, processing the sample of phosphogypsum by the present process produced a concentrate comprising greater than 2.5% rare earth elements, despite comprising a low concentration of rare earth elements in the phosphogypsum starting sample. A rare earth element feed stock comprising 2.5% rare earth elements would be considered to be rare and exceptional. The results indicate that increased concentrations of rare earth elements would be achievable if a phosphogypsum feed stock comprising higher levels of rare earth elements was used.

The clean gypsum was separated from the impurities by simply pouring off. The poured off material was allowed to settle. Each settling may be referred to as a "sink". As the number of sinks increases, the finer the particles that are collected. The third sink was a mixture of the particles collected by the third and fourth sinks. The sinks, cleaned up gypsum, original gypsum, and the ammonium sulphate solution, were tested using ICP elemental analysis after passing through a 0.5 micron filter. No effort was made to wash or remove the entrained ammonium sulphate from the sunk samples. As a result, elemental concentrations of the separated sinks were likely to read lower than if they had been washed.

The results are shown in Table 1 (within the annex).

It was found that the present process is effective at removing and concentrating heavy metals, rare earths, uranium and thorium (both radioactive elements). In general, the third sink produces the largest increase in concentration of certain rare earth elements. Chromium, lithium, rubidium, and titanium were the exceptions which concentrated mostly in the second sink. The filtered ammonium sulphate solution comprised virtually no contaminates of interest. It was reasonably concluded that the contaminants tended towards being fine particles. A particle classification system would be expected to likely further improve the removal and concentration of contaminates from the cleaned up phosphogypsum.

It was found that the present process on average concentrated rare earth elements approximately twelve times. A notable exception to this was praseodymium, which the present process concentrated greater than 790 times. The present process, whilst effective, still left significant amounts of lanthanum, neodymium, cerium and samarium in the cleaned up gypsum. It is possible that classification via particle size may improve this separation still further.

The present process was found to be particularly effective at removing and concentrating uranium. Thus, the present process could be used to separate and concentrate uranium and thorium from gypsum.

The present process was found to be effective at removing and concentrating lead, mercury and zinc from source gypsum. Thus, another advantage of the present process is the ability to remove poisonous metals.

The present process also demonstrated that it could be used to extract and concentrate phosphorus from phosphogypsum feed stock.

Iron can be found in the cleaned-up gypsum. It is expected to be in the form of black iron oxide. It is expected that magnetic separation or classification by size could be used to further reduce the level of iron in the product.

Example 7

Collection of Rare Earth Elements and Precious Metals

Table 2 (in the annex) comprises a further set of test results for the present process performed with two different samples of phosphogypsum. These samples comprised less contamination that the previous samples tested. As per example 6, for both samples, the fine particle fraction comprised the highest concentration of rare earth elements. In spite of the initial concentration of the rare earth elements being low, the results demonstrate that the present process can separate out and concentrate rare earth elements and precious metals The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

TABLE 1

| Sample (mg/kg) | Phosphogypsum Raw | Cleaned up | First sink | Second sink | Third sink | Ammonium solution | Name | Concentration Ratio |
|---|---|---|---|---|---|---|---|---|
| Al | 226 | 93 | 114 | 40 | 689 | 7 | | |
| As | <1 | 2 | <1 | 3 | 5 | <0.01 | | |
| B | 514 | 260 | 98 | 78 | 544 | 0.06 | | |
| Ba | 307 | 112 | 265 | 2380 | 4497 | 0.06 | Barium | 14.6 |
| Be | <1 | <1 | <1 | <1 | <1 | <0.01 | | |
| Bi | <1 | <1 | <1 | <1 | <1 | <0.01 | | |
| Ca | >10,000 | >10000 | >10000 | >10000 | >10000 | 1260 | Calcium | Unknown |
| Cd | <1 | <1 | <1 | <1 | <1 | <0.01 | | |
| Ce | 835 | 308 | 526 | 6930 | >10000 | 3.1 | Cesuim | >12 |
| Co | <1 | <1 | <1 | 1 | 1 | <0.01 | | |
| Cr | 39 | 35 | 62 | 41 | 36 | 0.04 | | |
| Cu | 4 | 2 | 4 | 17 | 22 | 0.07 | | |
| Dy | 9 | 15 | 9 | 88 | 127 | 0.13 | Dysprosium | 14.1 |
| Er | <1 | <1 | 1 | 20 | 36 | 0.04 | Erbium | >36 |
| Eu | <1 | <1 | <1 | 54 | 90 | 0.07 | Europium | >90 |

TABLE 1-continued

| Sample (mg/kg) | Phosphogypsum Raw | Cleaned up | First sink | Second sink | Third sink | Ammonium solution | Name | Concentration Ratio |
|---|---|---|---|---|---|---|---|---|
| Fe | 1087 | 812 | 1295 | 3794 | 5231 | 1.62 | Iron | 4.8 |
| Ga | 5 | 2 | 3 | 53 | 91 | 0.02 | | |
| Gd | 4 | <1 | <1 | 177 | 285 | 0.27 | Gadolium | 71.3 |
| Ge | 2 | <1 | <1 | 10 | 16 | 0.01 | | |
| Hg | <1 | <1 | <1 | 2 | 6 | <0.01 | | |
| Ho | 1 | <1 | <1 | 9 | 16 | 0.02 | Holmium | 16.0 |
| In | <1 | <1 | <1 | <1 | <1 | <0.01 | | |
| K | 2505 | 2108 | 2020 | 2966 | 3906 | 3.21 | Potassium | 1.6 |
| La | 692 | 241 | 486 | 5581 | 9040 | 2.2 | Lanthanum | 13.1 |
| Li | 8 | 1 | 3 | 3 | 2 | <0.01 | | |
| Lu | <1 | <1 | <1 | <1 | <1 | <0.01 | Lutetium | Unknown |
| Mg | 96 | 23 | 137 | 115 | 142 | 1.16 | | |
| Mn | 45 | 36 | 50 | 111 | 105 | 0.02 | | |
| Mo | <1 | <1 | <1 | 4 | 6 | 0.01 | | |
| Na | 52 | 28 | 7 | 125 | 1002 | 8.8 | Sodium | 19.3 |
| Nb | 9 | 10 | 15 | 13 | 22 | 0.01 | | |
| Nd | 337 | 131 | 194 | 2044 | 3118 | 1.77 | Neodymium | 9.3 |
| Ni | <1 | 1 | <1 | <1 | <1 | <0.01 | | |
| P | 1669 | 681 | 10 | 4006 | 5851 | 27.14 | Phosphorus | 3.5 |
| Pb | 7 | 3 | <1 | 32 | 50 | 0.02 | | |
| Pr | <1 | <1 | 19 | 529 | 790 | 0.22 | Praseodymium | >790 |
| Rb | 9 | 9 | 9 | 19 | 13 | <0.01 | | |
| Re | <1 | <1 | <1 | <1 | <1 | <0.01 | | |
| Ru | <1 | <1 | <1 | <1 | <1 | <0.01 | | |
| S | >10000 | >10000 | >10000 | >10000 | >10000 | >10000 | Sulfur | Unknown |
| Sb | <1 | <1 | <1 | <1 | <1 | <0.01 | | |
| Sc | <1 | <1 | <1 | <1 | <1 | <0.01 | Scandium | Unknown |
| Se | <1 | <1 | <1 | 1 | 3 | <0.01 | | |
| Si | <1 | <1 | <1 | 113 | 3239 | 3.71 | Silicon | >3239 |
| Sm | 37 | 28 | <1 | <1 | 189 | 0.21 | Samarium | 5.1 |
| Sn | 138 | 137 | 134 | 116 | 152 | <0.01 | | |
| Sr | 9059 | 3753 | 7441 | >10000 | >10000 | 26.58 | Strontium | Unknown |
| Ta | <1 | <1 | <1 | <1 | <1 | <0.01 | | |
| Tb | <1 | <1 | <1 | <1 | 2 | 0.02 | Terbium | >2 |
| Te | <1 | <1 | <1 | <1 | <1 | <0.01 | | |
| Th | 28 | 3 | 25 | 66 | 124 | <0.01 | Thorium | 4.4 |
| Ti | 788 | 571 | 920 | 2923 | 2879 | 0.75 | Tin | 3.7 |
| Tl | <1 | <1 | <1 | <1 | 2 | <0.01 | | |
| Tm | <1 | <1 | <1 | 3 | 4 | <0.01 | Thulium | >4 |
| U | <1 | <1 | <1 | 10 | 17 | 0.01 | Uranium | >17 |
| V | <1 | <1 | <1 | <1 | <1 | <0.01 | | |
| W | 26 | <1 | <1 | <1 | 21 | <0.01 | | |
| Y | 46 | 21 | 25 | 211 | 337 | 0.57 | Ytterbium | 7.3 |
| Yb | <1 | <1 | <1 | <1 | 5 | 0.01 | | |
| Zn | 2 | 1 | 3 | 4 | 340 | 0.08 | | |

TABLE 2

| Sample (mg/kg) | BC PG RAW | BC PG CLEAN | BC PG SINK 2 | BC PG SINK 3 | RCF PG RAW | RCF PG CLEAN | RCF PG FLOAT 2 |
|---|---|---|---|---|---|---|---|
| Chloride | — | <1 | — | — | — | <1 | — |
| Ag | <1 | <1 | 1 | 4 | <1 | <1 | 2 |
| As | 1 | <1 | 1 | 3 | <1 | 1 | 2 |
| Au | <1 | <1 | <1 | <1 | <1 | <1 | 1 |
| B | 35 | 3 | 8 | 9 | 1 | 3 | 26 |
| Be | <1 | <1 | <1 | 1 | <1 | <1 | <1 |
| Bi | 1 | 1 | <1 | 1 | <1 | <1 | 2 |
| Cd | 1 | <1 | <1 | 1 | 1 | <1 | 1 |
| Ce | 63 | 52 | 64 | 472 | 131 | 123 | 329 |
| Co | <1 | <1 | <1 | <1 | <1 | <1 | <1 |
| Cr | 32 | 11 | 20 | 91 | 25 | 18 | 66 |
| Cu | 40 | 19 | 46 | 101 | 7 | 7 | 25 |
| Dy | 4 | 2 | 8 | 37 | 6 | 5 | 14 |
| Er | <1 | <1 | <1 | 15 | <1 | <1 | 6 |
| Eu | <1 | <1 | <1 | 6 | <1 | <1 | <1 |
| Fe | 1121 | 349 | 1199 | 5692 | 1745 | 967 | 7271 |
| Ga | <1 | <1 | 1 | 3 | 1 | <1 | 2 |
| Gd | <1 | <1 | <1 | 28 | <1 | <1 | <1 |
| Ge | <1 | <1 | <1 | <1 | <1 | <1 | 1 |
| Hg | <1 | <1 | <1 | 1 | <1 | <1 | <1 |
| Ho | <1 | <1 | 1 | <1 | <1 | <1 | <1 |

TABLE 2-continued

| Sample (mg/kg) | BC PG RAW | BC PG CLEAN | BC PG SINK 2 | BC PG SINK 3 | RCF PG RAW | RCF PG CLEAN | RCF PG FLOAT 2 |
|---|---|---|---|---|---|---|---|
| In | <1 | <1 | <1 | 5 | <1 | <1 | 2 |
| Ir | <1 | <1 | <1 | <1 | <1 | <1 | <1 |
| K | <1 | <1 | <1 | <1 | <1 | <1 | <1 |
| La | 21 | 14 | 33 | 165 | 20 | 17 | 91 |
| Li | 2 | 2 | <1 | 2 | 2 | 2 | 2 |
| Lu | <1 | <1 | <1 | <1 | <1 | <1 | <1 |
| Mo | 1 | <1 | 1 | 8 | 1 | <1 | 3 |
| Nb | <1 | <1 | <1 | 2 | <1 | <1 | 2 |
| Nd | 30 | 25 | 40 | 232 | 66 | <1 | 127 |
| Ni | 125 | 72 | 66 | 91 | 64 | <1 | 72 |
| P | 2705 | 488 | 800 | 4491 | 2487 | 921 | 4941 |
| Pb | 29 | 19 | 59 | 81 | 6 | 58 | 32 |
| Pd | <1 | <1 | <1 | <1 | <1 | <1 | <1 |
| Pr | <1 | <1 | <1 | 16 | <1 | <1 | <1 |
| Pt | <1 | <1 | <1 | <1 | <1 | <1 | <1 |
| Rb | 7 | <1 | <1 | 1 | 1 | <1 | 7 |
| Re | <1 | <1 | <1 | <1 | <1 | <1 | <1 |
| Rh | <1 | <1 | <1 | <1 | <1 | <1 | <1 |
| Ru | <1 | <1 | <1 | <1 | <1 | <1 | <1 |
| Sb | <1 | <1 | 2 | 1 | <1 | 1 | <1 |
| Sc | <1 | <1 | <1 | 1 | <1 | <1 | 3 |
| Se | 1 | <1 | 7 | 23 | 1 | <1 | 2 |
| Si | 5730 | 274 | 3232 | >100000 | 5443 | 3072 | >10000 |
| Sm | 5 | 1 | 4 | 47 | 6 | 19 | 22 |
| Sn | 28 | 26 | 56 | 72 | 47 | 64 | 80 |
| Ta | <1 | <1 | <1 | <1 | <1 | <1 | <1 |
| Tb | <1 | <1 | <1 | 1 | <1 | <1 | 2 |
| Th | <10 | <10 | <10 | 30 | <10 | <10 | 14 |
| Ti | 106 | 24 | 203 | 1159 | 173 | 96 | 664 |
| Tl | <1 | <1 | <1 | <1 | <1 | <1 | <1 |
| Tm | <1 | <1 | <1 | <1 | <1 | <1 | <1 |
| U | <10 | <10 | <10 | <10 | <10 | <10 | <10 |
| V | 1 | <1 | 1 | 20 | 3 | 6 | 23 |
| W | <1 | <1 | 11 | 12 | 3 | 1 | 10 |
| Y | 37 | 21 | 43 | 374 | 40 | 39 | 100 |
| Yb | <1 | <1 | <1 | 9 | <1 | <1 | 1 |
| Zn | 31 | 50 | 50 | 76 | 30 | 77 | 61 |
| Zr | 21 | 2 | 8 | 37 | 2 | 4 | 12 |

The invention claimed is:

1. A method for releasing impurities from a calcium-based mineral, the method comprising:
    reacting a calcium-based mineral containing impurities with an aqueous solution of one or more ionic salts at a temperature of approximately 85° C. or above to form a slurry, wherein at least one of the calcium-based mineral and the one or more ionic salts comprises sulphate and at least one of the calcium-based mineral and the one or more ionic salts comprises ammonium, and wherein the concentration of the solution is approximately 25% or higher mass fraction, such that double salt crystals are formed and impurities previously enveloped within the calcium-based mineral are released and precipitated into the slurry; and
    separating the double salt crystals from the impurities.

2. The method according to claim 1, wherein the aqueous salt solution is a concentrated solution having a concentration of salt between approximately 25% and 40% mass fraction.

3. A method according to claim 1, further comprising reacting the double salt crystals in an aqueous solution to precipitate gypsum.

4. The method according to claim 1, wherein the calcium based mineral is any mineral having a significant calcium component.

5. The method according to claim 4, wherein the calcium based mineral is in the form of calcium carbonate ($CaCO_3$), or calcium sulphate ($CaSO_4$), or calcium oxide (CaO) or calcium sulphite ($CaSO_3$).

6. The method according to claim 1, wherein the calcium based mineral comprises particles having a size less than 1000 microns, optionally less than 250 microns.

7. The method according to claim 1, wherein the reacting comprises heating to a temperature of approximately 100° C. or above.

8. The method according to claim 1, wherein the residence time of the reaction is between approximately 5 minutes and 2 hours, optionally between approximately 10 and 20 minutes.

9. The method according to claim 1, wherein the reacting is carried out at a pressure between approximately atmospheric pressure and 4 atmospheres, optionally between approximately 1 and 2 atmospheres.

10. The method according to claim 1, wherein the calcium based mineral to water mass ratio is greater than 1:1, optionally between 1:2 and 1:50, and further optionally between 1:5 and 1:20.

11. The method according to claim 1, further comprising capturing at least some of any gases released by the reaction.

12. The method according to claim 1, wherein the one or more ionic salts comprise ammonium sulphate and the double salt crystals comprise crystals of koktaite.

13. The method according to claim 12, wherein the koktaite comprises a double salt crystal of calcium sulphate and ammonium sulphate which has the chemical formula; $(NH_4)_2SO_4 \cdot CaSO_4 \cdot H_2O$ and the double salt optionally comprises one or more of the following: one or more other double salts of ammonium sulphate and calcium sulphate selected from di-calcium salt and penta-calcium salt; and calcium sulphate and its related hydrates.

14. The method according to claim 13, wherein the gypsum product is primarily calcium sulphate dihydrate, but may also include $CaSO_4 \cdot xH_2O$ where x is between 0 and 2.

15. The method of claim 1, wherein when reacting the calcium-based mineral containing the impurities with an aqueous solution, the impurities are released in solution or as a solid or semi-solid layer.

16. The method of claim 1, wherein the impurities comprise rare earth elements or precious metals and the method further comprises collecting the rare earth elements or precious metals.

17. The method of claim 1, wherein after separating the double salt crystals from the impurities, the impurities are separated from the aqueous salt solution.

18. A method for releasing impurities from a calcium-based mineral to produce gypsum, the method comprising:
    reacting a calcium-based mineral containing impurities with an aqueous solution of one or more ionic salts at a temperature of approximately 85° C. or above, wherein at least one of the calcium-based mineral and the one or more ionic salts comprises sulphate and at least one of the calcium-based mineral and the one or more ionic salts comprises ammonium, and wherein the concentration of the solution is approximately 25% or higher mass fraction such that double salt crystals are formed and impurities are released separating the double salt crystals from the impurities;
    reacting the double salt crystals with an aqueous solution to precipitate gypsum; and
    separating the gypsum from the aqueous solution.

19. A method for releasing impurities from a calcium-based mineral to produce chalk, the method comprising:
    reacting a calcium-based mineral containing impurities with an aqueous solution of one or more ionic salts at a temperature of approximately 85° C. or above, wherein at least one of the calcium-based mineral and the one or more ionic salts comprises sulphate and at least one of the calcium-based mineral and the one or more ionic salts comprises ammonium, and wherein the concentration of the solution is approximately 25% or higher mass fraction such that double salt crystals are formed and impurities are released separating the double salt crystals from the impurities; and
    converting the double salt crystals to chalk.

20. The method according to claim 19, wherein converting the double salt crystals to chalk comprises reacting the double salt crystals with a second aqueous solution in the presence of one or more gases.

21. The method according to claim 20, wherein the one or more gases used in converting the double salt crystals to chalk are produced during the reaction of the calcium-based mineral containing impurities with the aqueous salt solution.

22. A method for releasing impurities from a calcium-based mineral to produce a mixture of rare earth elements or precious metals, the method comprising:
    reacting a calcium-based mineral containing a mixture of rare earth elements or precious metals with an aqueous solution of one or more ionic salts at a temperature of approximately 85° C. or above, wherein at least one of the calcium-based mineral and the one or more ionic salts comprises sulphate and at least one of the calcium-based mineral and the one or more ionic salts comprises ammonium, and wherein the concentration of the solution is approximately 25% or higher mass fraction such that double salt crystals are formed and impurities are released;
    separating the double salt crystals from the mixture of rare earth elements or precious metals; and
    collecting the mixture of rare earth elements or precious metals.

* * * * *